July 30, 1968     C. F. SCOTT     3,394,973
DISPLAY CABINET Filed Oct. 18, 1965     9 Sheets-Sheet 1

Fig. 1.

INVENTOR.
CHARLES F. SCOTT
BY
Fishburn and Holt
ATTORNEYS

July 30, 1968

C. F. SCOTT 3,394,973

DISPLAY CABINET

Filed Oct. 18, 1965

INVENTOR.
CHARLE F. SCOTT

BY
Fishburn and Holt
ATTORNEYS

July 30, 1968

C. F. SCOTT

3,394,973

DISPLAY CABINET

Filed Oct. 18, 1965

INVENTOR.
CHARLES F. SCOTT
BY
Fishburn and Gold
ATTORNEYS

July 30, 1968 C. F. SCOTT 3,394,973
DISPLAY CABINET

Filed Oct. 18, 1965 9 Sheets-Sheet 6

INVENTOR.
CHARLES F. SCOTT
BY
Fishburn and Gold
ATTORNEYS

July 30, 1968

C. F. SCOTT 3,394,973

DISPLAY CABINET

Filed Oct. 18, 1965

INVENTOR.
CHARLES F. SCOTT

BY
*Fishburn and Gold*

ATTORNEYS

July 30, 1968

C. F. SCOTT 3,394,973

DISPLAY CABINET

Filed Oct. 18, 1965

INVENTOR.
CHARLES F. SCOTT
BY
Fishburn and Gold
ATTORNEYS

July 30, 1968

C. F. SCOTT 3,394,973

DISPLAY CABINET

Filed Oct. 18, 1965

INVENTOR.
CHARLES F. SCOTT

BY
*Fishburn and Gold*
ATTORNEYS

United States Patent Office 3,394,973
Patented July 30, 1968

3,394,973
DISPLAY CABINET
Charles F. Scott, Overland Park, Kans., assignor to Hallmark Cards, Incorporated, Kansas City, Mo., a corporation of Missouri
Filed Oct. 18, 1965, Ser. No. 497,053
8 Claims. (Cl. 312—262)

ABSTRACT OF THE DISCLOSURE

A merchandise display rack comprises foldable panels and frame members having tabs providing versatile structure for selectively receiving several different merchandise support items, including shelf units which pivotally engage the tabs and are supported by pivotal braces engaging other of the tabs.

This invention relates to a display rack or cabinet and more particularly, to a combination of a foldable housing structure and merchandise supporting elements for use in the display of articles of merchandise.

The necessity of providing a plurality of different cabinet structures to accommodate a plurality of different merchandise support facilities has produced a costly problem in the art. Additional transportation costs are experienced when different cabinet units must be shipped due to a change in merchandise support facilities and further costs are experienced due to the storage of unused cabinet units when the new merchandise support facilities require new and different cabinet units. To help overcome this existing problem in the art, I have provided a versatile display rack wherein a plurality of merchandise support shelves may be selectively secured in many positions which may vary in height and tilt. Selected shelves include a backstop riser which may be positioned in front or back of the merchandise supporting surface as desired for different purposes. The versatility of shelf positioning is obtained through the use of upwardly spaced tabs on frame structure which are selectively engaged with the shelves and braces which selectively engage other of the tabs.

The principal objects of the present invention are: to provide versatile merchandise facilities for use in stores or the like wherein greatly varying articles of merchandise are easily accessible, thus facilitating customer self-service; and to provide a new and novel storage and display cabinet which is relatively simple in construction and may be manufactured at a low cost.

Other objects and advantages of this invention will become apparent from the following description taken in connection with the accompanying drawings wherein are set forth by way of illustration and example certain embodiments of this invention.

Referring to the drawings in more detail:

The reference numeral 1 generally indicates a storage and display cabinet or rack embodying the features of this invention. In the illustrated embodiment in FIGS. 1 to 12, the storage and display cabinet has a housing 2 comprised of side walls 3 and 4 with a back wall here shown as a back framework 5 extending between and hingedly connected to the opposed side walls 3 and 4, a bottom panel 6 hingedly connected to the back frame 5 and releasably connected to side walls 3 and 4 and a front wall here shown as a front closure member 7 of lesser height than the back frame 5 hingedly connected to the bottom panel 6 and releasably connected to side walls 3 and 4. As illustrated, the front closure member 7 is comprised of two sliding doors 8 and 9 to provide access to the lower interior portion of the housing 2. The remaining portion of the front 10 of the housing 2 is open and has shelf units 11 releasably mounted therein for storage and display of articles of merchandise. The upper portion of the front of the housing 2 above closure member 7 is open allowing access to the interior 11' of said housing 2 wherein are contained the various merchandise supporting facilities described later in the specification.

Figure 1:
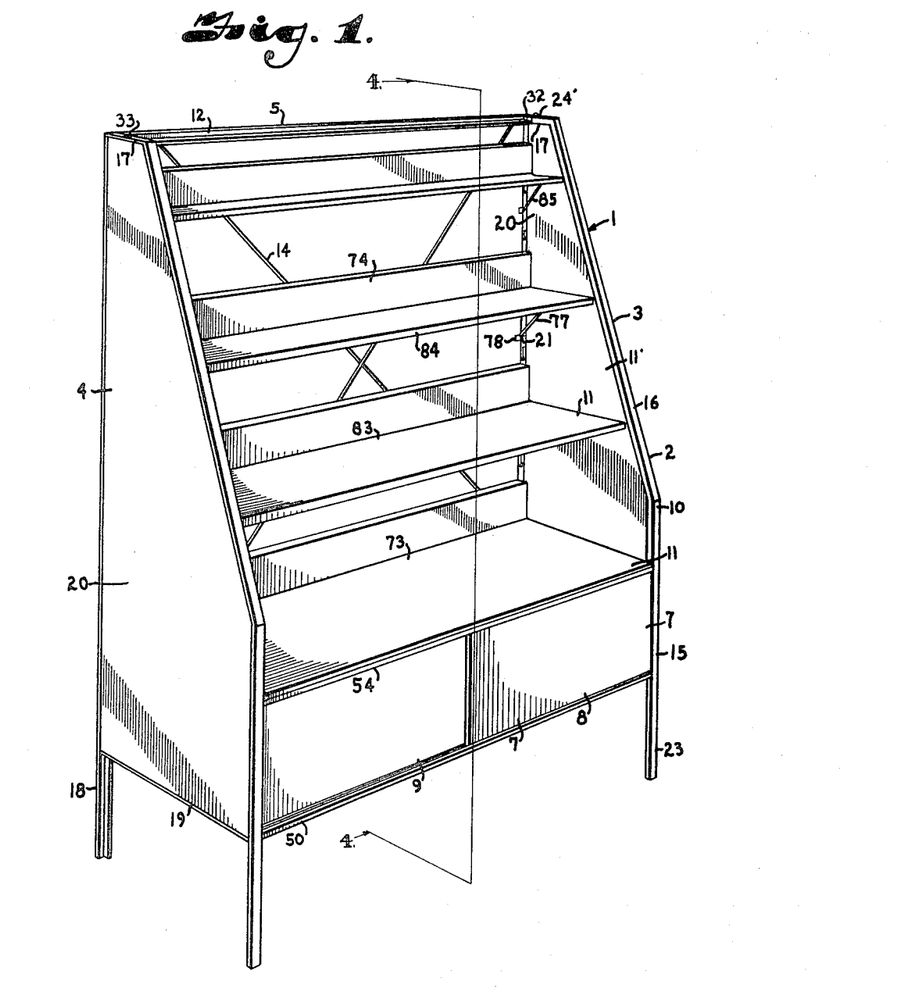
FIG. 1 is a perspective view of the storage and display cabinet embodying the features of this invention.
Figures 2, 3, 4:
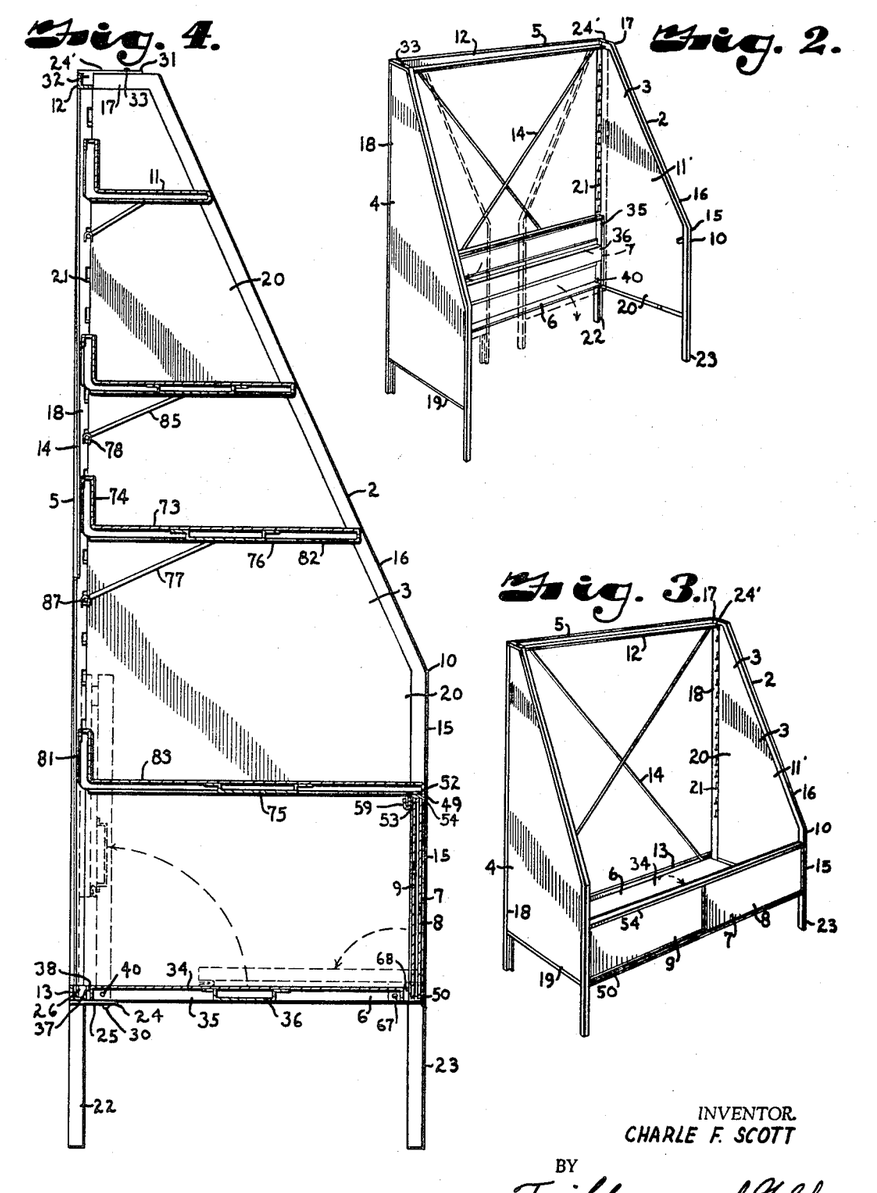
FIG. 2 is a perspective view of the housing of the storage and display cabinet embodying the features of this invention showing the foldable nature of the side walls and bottom panel of the housing.
FIG. 3 is a perspective view of the housing of the storage and display cabinet showing the foldable nature of the front closure member and the position of the closure member, bottom panel and side walls when fully extended.
FIG. 4 is a vertical cross-sectional view through the storage and display cabinet on an enlarged scale, particularly showing the shelf elements and their cooperation with the housing member, and also the relation of the bottom panel and the closure member along with the hinge connections between said member and panel.

The back frame 5 is comprised of an upper horizontal frame member 12, a lower horizontal frame member 13 and brace rods 14 as best shown in FIGS. 3 and 4. The frame members 12 and 13 are secured in overlying spaced rleation from one another by means of the back frame 5 and the rods 14 which extend in a crossed fashion between said frame members 12 and 13 with the ends of each of said rods 14 secured to opposite ends of frame members 12 and 13 to hold members 12 and 13 in spaced relation.

Referring to FIG. 4, the side wall 3 is formed of a series of frame members 15, 16, 17, 18 and 19 and end panel 20. In the preferred embodiment disclosed, these frame members are all metal angles; however, other types of material and shapes could be utilized. The frame member 15, as illustrated, is vertically disposed and extends upwardly to a point in vertically spaced relation from the top of the closure member 7. The frame member 16 is connected to the frame member 15 by suitable means and is inclined upwardly towards the back frame 5 of the housing 2. The frame member 16 terminates at the top of side wall 3 in spaced relation forwardly of the back frame 5. The frame member 17 is illustrated as being horizontally disposed and extends between the frame members 16 and 18 and is secured thereto by suitable means. The frame member 18 is vertically disposed and extends the entire height of the display rack 1. The frame member 19 is disposed horizontally, extending between and being secured to frame members 15 and 18. The frame members 18 of each of the side walls 3 and 4 are illustrated as having a plurality of tabs 21 struck therefrom and extending toward the interior of the housing to support shelf units 11.

The end panels 20 of side walls 3 and 4 are formed of plywood or similar material and may contain a colored plastic coating for decorative purposes. The end panels 20 are secured to the angles forming the framework by means of rivets or other conventional means. The legs of each of the angular frame members are disposed with one extending inwardly parallel with the plane of the end panel 20 and the other leg extending outwardly away from the housing 2, thus providing a recessed area for receipt of end panel 20. For example, in FIG. 5 the plywood or similar material end panel 20 is recessed within the confines of legs 22 and 23 of frame angles 15 and 18. The side wall 4 is constructed in an identical manner.

Figures 6, 7, 8, 9, 10:
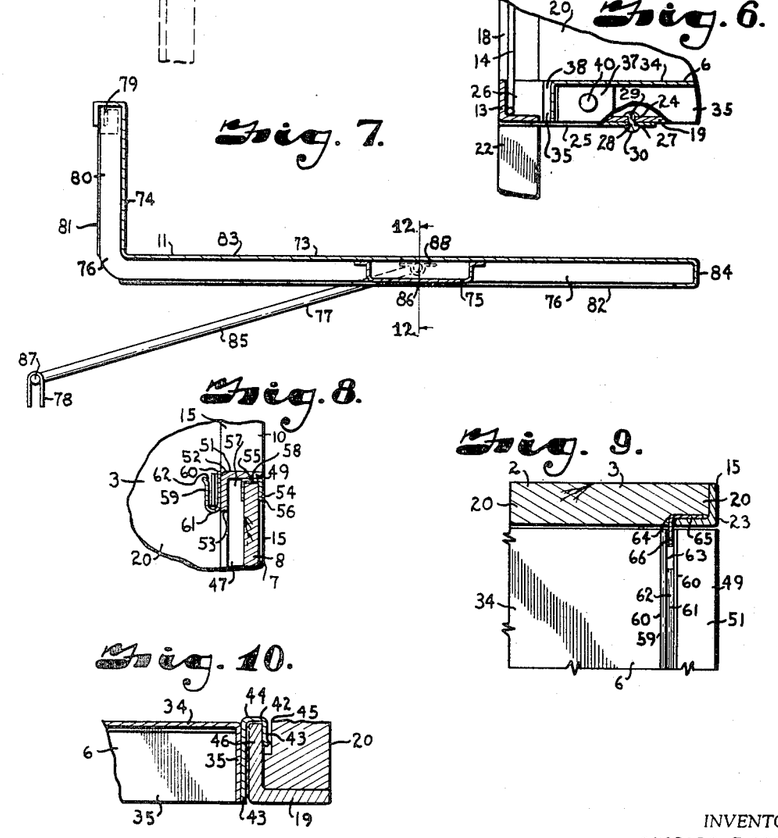
FIG. 6 is a fragmentary vertical cross-sectional view showing the hinge element utilized to secure the bottom panel to the back frame with a break-away portion showing the hinge element for securing the side wall to the back frame.
FIG. 7 is a vertical cross-sectional view of the shelf element.
FIG. 8 is a fragmentary horizontal cross-sectional view through the side wall of the housing showing the means for securing and retaining the closure member in a vertical position.
FIG. 9 is a fragmentary vertical cross-sectional view through a portion of the bottom panel and side wall showing the means for securing the bottom panel to the side wall and retaining the bottom panel in a horizontal position.
FIG. 10 is a vertical cross-sectional view taken along line 10—10 of FIG. 5.

The side wall 3 is secured to the back frame 5 by means of two hinge connections 24 and 24'. Hinge connection 24 shown in FIG. 6 is comprised of a hinge plate 25 with a flange 26, said flange 26 being welded to the end of the lower horizontal frame member 13 of the back frame 5. The hinge plate 25 contains an aperture 27 therein through which hinge pin 28 is extended. Hinge pin 28 also extends through an aligned aperture 29 in the angle frame member 19 and has enlarged end portions 30 utilized to retain pin 28 in apertures 27 and 29.

The hinge connection 24' secures angle frame member 17 to the upper horizontal frame member 12 of the back frame 5. The hinge connection 24' is comprised of a hinge plate 31 with a flange 32 which is welded to the end of frame member 12 and a hinge pin 33 rotatably securing hinge plate 31 to the angle frame member 17 of the side wall 3 in the same manner as shown and described for hinge connection 24. With the side wall 3 so hingedly secured to the back frame 5, the side wall 3 is free to rotate inwardly toward back frame 5 as shown by the arrow at FIG. 2.

The side wall 4 is constructed in the same manner as side wall 3 and is secured to the back frame 5 by hinge connections identical to those described in relation to side wall 3. The side wall 4 is therefore free to rotate inwardly toward the back frame 5 in the manner shown by the arrow in FIG. 2, thus allowing the housing to be folded into a compact package to facilitate its transporting and storage.

The bottom panel 6, as illustrated, is comprised of a support portion 34, down-turned side flanges 35 and a reinforcing member 36. The side flanges 35 extend downwardly from four edges of the support portion 34 of the bottom panel 6 with the reinforcing member 36 extending longitudinally across the bottom panel 6 between the side flanges 35 to reinforce the support portion 34.

Figure 5:
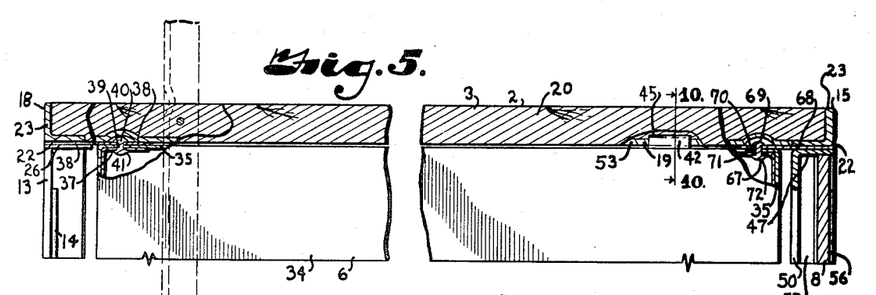
FIG. 5 is a horizontal cross-sectional view through a side wall of the housing with break-away portions showing the hinge connection of the side wall to the back frame and the closure member to the bottom panel and further showing the means utilized to secure the bottom panel to the side wall to retain the bottom panel in a horizontal position.

The bottom panel 6 is hingedly connected to the back frame 5 by means of two hinge connections 37, one of which is shown in FIG. 5. The hinge connection 37 is comprised of hinge plate 38 having an aperture 39 and a hinge pin 40. The hinge pin 40 extends through aperture 39 in plate 38 and an aligned aperture 41 in side flange 35 of bottom panel 6 to rotatably engage the hinge plate 38 and bottom panel 6. The hinge plate 38 is secured to flange 26 of hinge plate 25 to rotatably mount bottom panel 6 on back frame 5 so that said bottom panel may be rotated in a manner shown by the arrows in FIGS. 2 and 4. The pivot point of hinge connection 37 is rearwardly located toward back frame 5 in relation to the pivot points of hinge connections 24 and 24' of side walls 3 and 4 to allow said side walls 3 and 4 to lie flatly against bottom panel 6 when folded.

The side flanges 35 adjacent each side wall 3 and 4 have a retaining clip 42 secured thereto by suitable means as shown in FIG. 10. The retaining clip 42 is illustrated as generally U-shaped having legs 43 and a base portion 44. When the bottom panel 6 is lowered from its position adjacent the back frame 5 to a horizontal position, one leg 43 of the retaining clip 42 is received into a slot 45 in end panel 20, illustrated as between the end panel 20 and the frame member 19 with the base portion 44 of the clip 42 disposed in contacting relation with an upper leg 46 of the framing member 19, thereby retaining the bottom panel 6 in a horizontal position. A similar structure exists adjacent side wall 4.

The closure member 7, as illustrated in FIGS. 16, 19, 22, 25 and 30, is comprised of four framing members including two side frame members 47, an upper frame member 49, a lower frame member 50 and two sliding doors 8 and 9. The side frame member 47 is shown as a metal angle welded to the upper and lower frame members 49 and 50 as is side frame member 48 to form a rectangular frame. The upper and lower frame members 49 and 50 are each illustrated as being comprised of an angle member 51 having an upper or lower flange 52 and a side flange 53 and a channel-shaped track member 54, having a base portion 55 and legs 56. The track member 54 is disposed in opposed spaced relation from the side flange 53 of the angle member 51 and extends longitudinally the full length of the closure 7 with its base portion 55 secured to the upper or lower flange 52 by suitable means such as welding to define two grooves 57 and 58 for receiving the sliding doors 8 and 9, groove 57 being between side flange 53 and the track member 54 and groove 58 being between the legs 56 of the track member 54.

A retainer catch 59 is secured to the side flange 53 of the upper framing member 49 of the closure 7 by suitable means and, as illustrated, extends longitudinally along the full length of closure 7. The retainer catch 59 is generally channel-shaped having legs 60 and a base portion 61 defining an upwardly open groove 62. The retainer catch 59 is shown as being secured to the side flange 53 of the upper framing member 49 by means of one of its legs 60. At each end of the retainer catch 59, a notch 63 is cut in the base portion 61 to facilitate the receipt of a retainer 64 on each of the side walls 3 and 4.

As shown in FIG. 9, the retainer 64 on side wall 3 is an angle having flanges 65 and 66 with flange 65 secured to frame member 15 of side wall 3 and flange 66 received within groove 62 of the retainer catch 59 between legs 60 and overlying notch 63. The cooperation between the flange 66 of the retainer 64 and legs 60 of the retainer catch 59 holds the closure member 7 in an upright position.

The front closure member 7 is hingedly secured at each end thereof adjacent each of the side walls 3 and 4 by hinge connections 67, one of which is shown in FIG. 5. A hinge plate 68 extends forwardly from the bottom panel 6 and is welded to the side framing member 47 of the closure member 7. The hinge plate 68 is secured to side flange 35 of bottom panel 6 by means of a hinge pin 69 which extends through aligned apertures 70 and 71 in the hinge plate 68 and the side flange 35 respectively and has enlarged heads 72 to retain said hinge pin 69 within the aligned apertures 70 and 71. As shown in FIGS. 5 and 6, the upper flange 46 of the angle framing member 24 is bent inwardly at the hinge connection to provide space for the enlarged head 72 of hinge pin 69. The closure 7 is therefore free to rotate inwardly to a position overlying bottom panel 6 as shown in FIG. 4 and thence to a position adjacent back frame 5.

In order to dismantle the housing, it is necessary to lift upwardly on the bottom panel 6 and closure member 7 to disengage retainer clip 42 from the framing member 19. When the closure member 7 is elevated, the retainer catch 59 is passed upwardly in relation to the retainer 64 and the flange 66 of the retainer 64 passes through notch 63. The closure member 7 may then be folded inwardly toward bottom panel 6 by slightly spreading side walls 3 and 4 outwardly to allow the side angle members 47 and 48 of closure 7 to clear the inturned flange 66′ of the retainer catch 64 on each of the side walls 3 and 4. The closure member 7 is then folded to a position in overlapping contact with bottom panel 6 as shown in dotted lines in FIG. 4. The bottom panel 6 and the front closure member 7 are then folded together upwardly to a vertical position adjacent the back frame 5 as shown in FIG 2 and by dotted lines in FIG. 4. With the bottom panel 6 and the front closure member 7 folded into this position, the side walls 3 and 4 may be folded inwardly to a position in generally contacting relation to bottom panel 6. The housing 2 is thereby folded into a flat package for ease of storage and transporting.

Referring to FIGS. 7 to 12, shelf unit 11 is shown as comprised of a merchandise support surface 73, back portion 74, reinforcing member 75, angles 76, braces 77 and retainers 78. The back portion 74 is shown as being integral with the support surface 73 and generally perpendicular thereto and having a hooked flange 79 and side flange 81. The hook flange 79 shown in FIG. 7 in dotted lines lies between the side flange 80 of angle 76 and the side flange 81 of the back portion 74. The hooked flange 79 receives tabs 21 of the vertical frame member 18 on side walls 3 and 4 to assist in supporting the shelf unit 11.

The merchandise support surface 73, as illustrated, is comprised of a planar support surface 83 with a front hook flange 84 and side flanges 82. The planar surface 83 extends rearwardly to back portion 74 and, in the preferred embodiment, is integral therewith, with hook flange 84 extending downwardly from its front edge. Angle 76 serves to reinforce the shelf unit 11 and is shown secured to the undersurface of the support surface 73 in spaced relation from the side flanges 81 and 82 and at each end of shelf unit 11 adjacent side walls 3 and 4.

Figures 11, 12, 14:
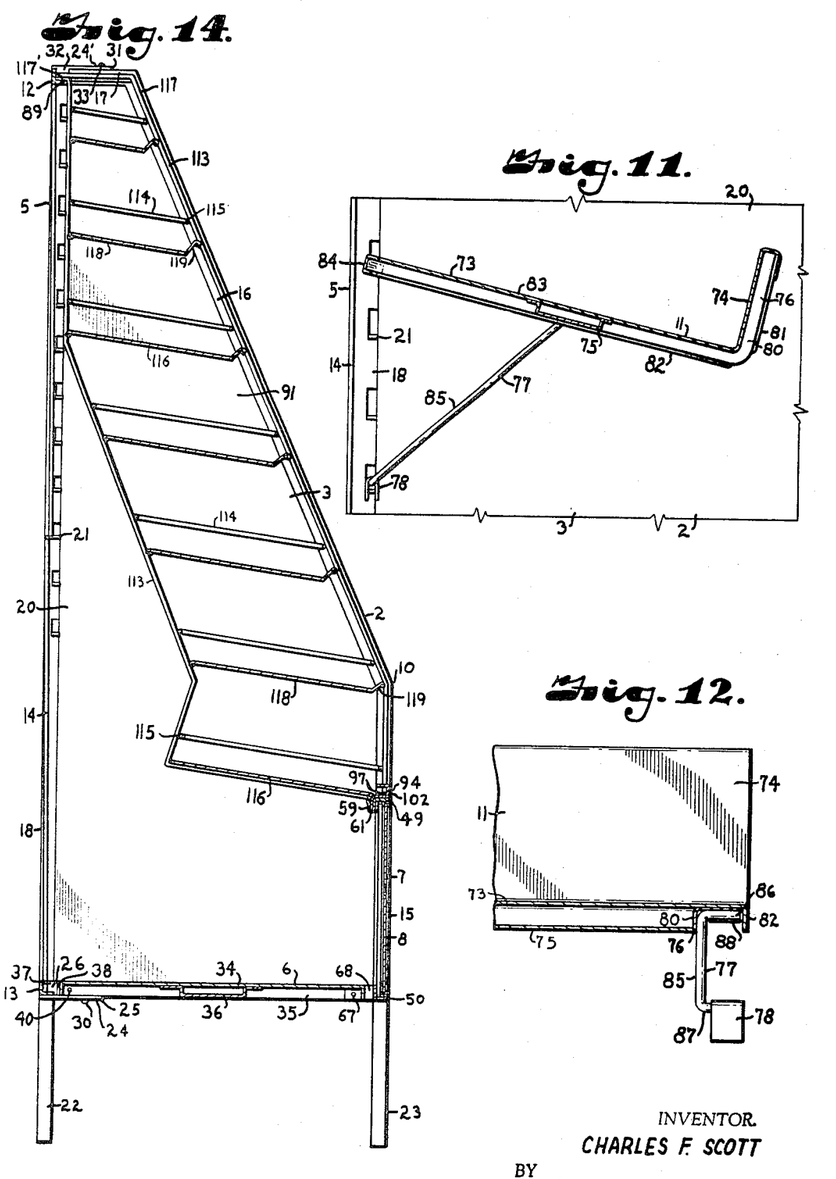
FIG. 11 is a fragmentary vertical cross-sectional view through a shelf element showing a modified disposition of said shelf element.
FIG. 12 is a vertical cross-sectional view along line 12—12 of FIG. 7.
FIG. 14 is a vertical cross-sectional view along line 14—14 of FIG. 13.

As shown in FIG. 12, the brace 77 is comprised of a central shaft portion 85 with an upper inturned leg portion 86 and a lower inturned leg portion 87. The upper leg portion 86 is rotatably mounted to the merchandise supporting surface 73 by a suitable means 88 between the angle 76 and side flange 82 of surface 83. The lower inturned leg portion 87 is secured by suitable means to a U-shaped retainer 78. The brace 77 and retainer 78 are illustrated in FIG. 12 at one end of the shelf unit 11; however, a similar structure exists at the opposite end of shelf 11. The retainer 78 is received over a tab 21 extending from each of the side walls 3 and 4 to retain brace 77 in an angular position to support the shelf 11.

As shown in FIG. 11, the shelf 11 may be turned such that the hook flange 84 at the front of the merchandise support surface 73 is received over tabs 21 of the side walls 3 and 4. The brace 77 is rotated to underlie the hook flange 84 with retainer 78 received over a lower tab 21 from side walls 3 and 4. The shelf 11 is illustrated in an inclined position such that rolls of ribbon or the like may be stored therein and would move to the front of the shelf 11 when the foremost roll is removed. It should be noted that shelf 11 in its reverse position as shown in FIG. 11 may also be disposed horizontally by simply moving the hook flange 84 to the next lower tab 21 of side walls 3 and 4.

Referring to FIGS. 13 to 17, another merchandise support means generally indicated by reference numeral 89 is shown releasably mounted in the foldable housing 2. The merchandise support 89 is comprised of two sections 90 and 91 in which associated articles of merchandise may be openly displayed and stored.

The merchandise section 90 is comprised of a back member 92, end panels 93 and a retainer device 94.

The back member 92 is comprised of an inclined merchandise support surface 95, a lower horizontal surface 96 with a flange 97 at its outer edge and an upper hook portion 98. The inclined merchandise support surface 95 is shown as a metal sheet material having a plurality of openings 99 therein in which merchandise support brackets 104 are engaged. The hook portion 98 at the upper edge of the supporting surface 95 overlies and bears upon framing member 12 of the back frame 5 to support and retain section 90 in housing 2. The retainer 94 is secured to flange 97 which extends downwardly from the horizontal surface 96 by welding or other suitable means.

Figures 13, 15, 16, 17:
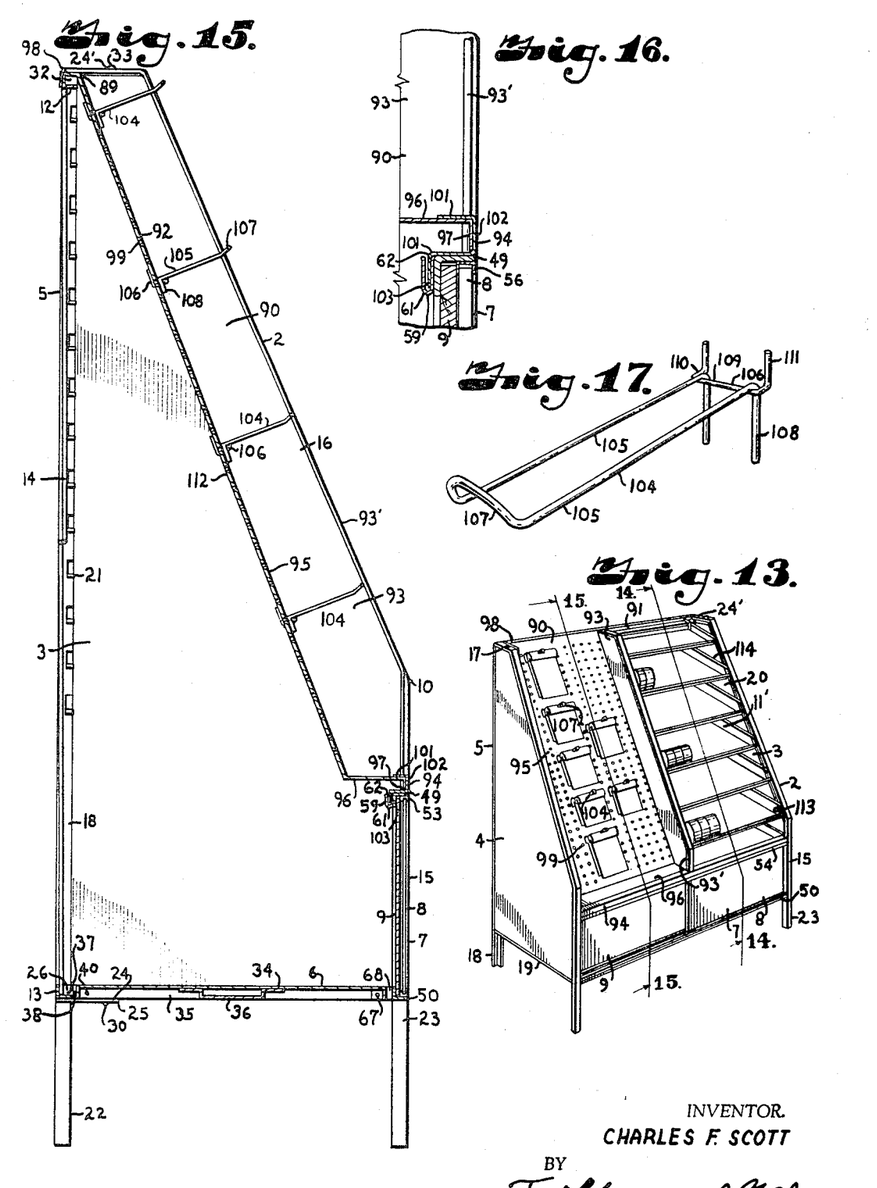
FIG. 13 is a perspective view of a modified form of the storage and display cabinet.
FIG. 15 is a vertical cross-sectional view along line 15—15 of FIG. 13.
FIG. 16 is a fragmentary vertical cross-sectional view showing the means for retaining the merchandise support means in the housing of the storage and display cabinet of FIG. 3.
FIG. 17 is a perspective view of the bracket and retainer shown in FIG. 15.

The retainer device 94 is illustrated as channel-shaped and comprises legs 101 with a base portion 102 disposed between and secured to legs 101 with a flange 103 extending downwardly from the end of one leg 101 opposite the base portion 102, as shown in FIG. 16. One of the legs 101 of the channel-shaped retainer 94 overlies the horizontal surface 96 of the support surface 95 with the base portion 102 in contacting relation to flange 97 of support surface 95. The retainer 94 may be secured to surface 96 and flange 97 by welding or other suitable means. The flange 103 of retainer 94 is disposed in groove 62 of retainer catch 59 on the front closure member 7. Section 90 is thereby securely retained within the housing 2 by means of the hook portion 98 at the upper edge of the supporting surface 95 and by the retainer 94 such that the section 90 may be removed from the housing 2 only by an upward vertical movement of section 90. As the section 90 may only be removed by this upward vertical movement, accidental displacement of the display means in normal customer usage is thereby prevented, thus providing a safe collapsible display cabinet.

End panels 93 illustrated as having a flat rod 93' over its exterior surface are secured to the merchandise supporting surface 95 at each end thereof by conventional means with one end panel 93 serving to divide the merchandise support means 89 into the two sections 90 and 91.

The merchandise in section 90 is supported on the surface 95 by means of brackets 104 shown in FIG. 17. The brackets 104 are illustrated as being formed of wire and comprised of a supporting portion 105 and a retainer 106. The supporting portion 105 has an upturned lip portion 107 to prevent the slippage of merchandise from bracket 104 and down-turned leg portions 108 which are disposed against the inclined support surface 95. The retainer 106 is U-shaped having a base portion 109 with legs 110 extending therefrom. A second leg portion 111 extends generally perpendicular to legs 110 at the outer edge of said legs 110 opposite base portion 109. As shown in FIG. 15, the legs 110 of retainers 106 are inserted into a pair of openings 99 in the inclined support surface 95 and are disposed with the legs adjacent the back surface 112 of the inclined support surface 95 with legs 110 extending through the perforations and outwardly from the support surface 95. The legs 108 of the support portion 105 are then inserted between the inclined support surface 95 and the base portion 109 of the retainer 106 to hold the support portion 105 in an extended position for receipt of merchandise.

The section 91 of the merchandise support means 89 is comprised of flat rods 113, cross rods 114, longitudinal rods 115 and shelf elements 116. As shown in FIG. 14, a flat rod 113 extends around the outer periphery of each end of section 91 and is braced by a plurality of cross rods 114 to form an end structure 117 at each end of section 91. The end structure 117 has an upper lip portion 117' comprised of an extension of the flat rod 113 which overlies and bears upon the upper frame member 12 of the back frame 5 to support and retain section 91 in housing 2. A plurality of longitudinal rods 115 extend between and are secured to the opposed end structures 117 by welding or other suitable means.

The shelf elements 116 are illustrated as made of a metal sheeting material and are secured at both their rearward and forward edges on the longitudinal rods 115 in an inclined fashion. The shelf element 116 is comprised of a supporting surface 118 and an upturned lip portion 119 at the forward edge of the supporting surface 118 to prevent slippage of merchandise therefrom.

The retainer 94 described in relation to section 90 of the support means 89 is also employed in section 91 to retain said section 91 in housing 2 in the same manner as previously described. Section 91, like section 90, may be removed from housing 2 only by vertically lifting section 91 to disengage retainer 94 from groove 62 in the closure member 7. The retainer 94, as shown in FIG. 14, is secured to the lowermost shelf element 116 and to the flat rods 113 of end structures 117.

Figure 18:
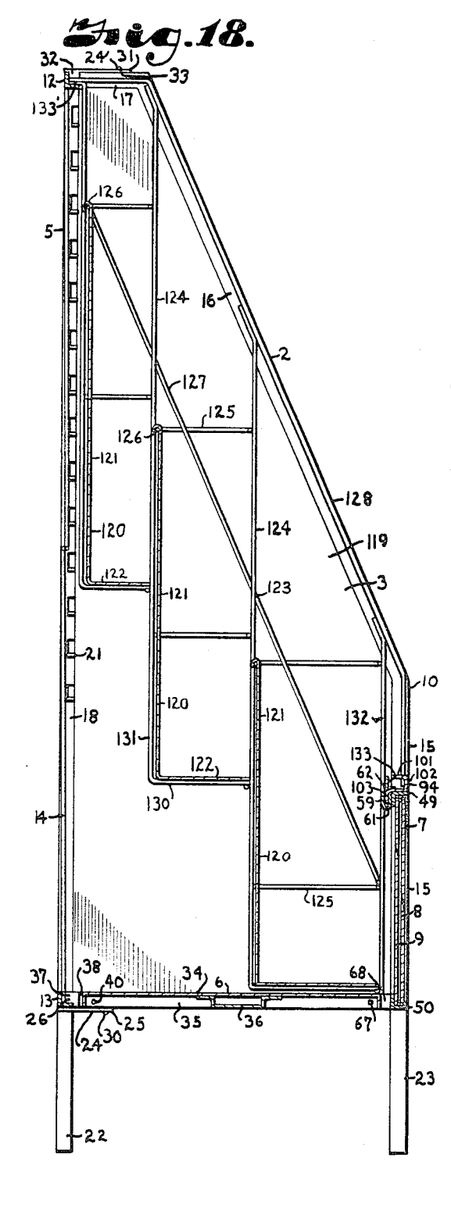
FIG. 18 is a vertical cross-sectional view taken along line 18—18 of FIG. 20.
Figure 19:
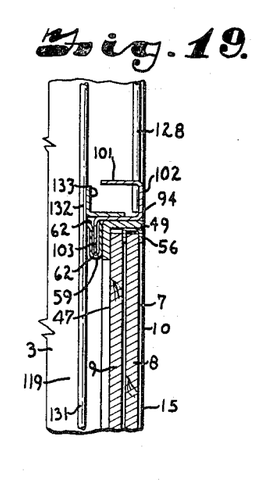
FIG. 19 is a fragmentary vertical cross-sectional view showing the means for retaining the merchandise support means in the housing of the storage and display cabinet of FIG. 20.
Figure 20:
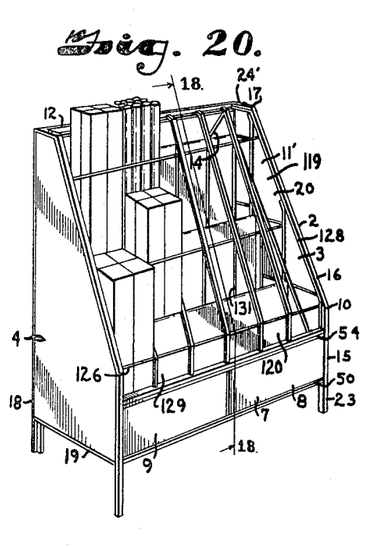
FIG. 20 is a perspective view of a modified form of the storage and display cabinet.

Referring to FIGS. 18 to 20, another modification is shown employing a merchandise support means 119 in housing 2 for the storage and display of rolled merchandise or merchandise contained in elongated boxes as shown in FIG. 20. In the illustrated embodiment, the merchandise support means 119 is shown as being comprised of three longitudinal shelf elements 120 which extend longitudinally across the merchandise support means 119, each being comprised of a back 121 and a lower support surface 122 upon which the merchandise is supported. Shelf elements 120 are retained within the merchandise support means 119 by means of a supporting structure 123. The supporting structure 123 is comprised of vertical rods 124, cross rods 125, longitudinal rods 126, diagonal rods 127 and flat rods 128. The flat rods 128 are disposed in spaced relation from one another in an inclined position corresponding to the inclination of the side walls 3 and 4 of housing 2 extending from closure member 7 to the top of back frame 5 with a plurality of vertical rods 124 secured thereto in spaced relation and extending vertically downwardly to define a plurality of compartments 129 extending transversely of the display means 119. Each of the vertical rods 124 is L-shaped having a horizontal leg 130 and a vertical leg 131. The horizontal leg 130 of each vertical rod 124 extends forwardly and is secured to the vertical leg 131 of an adjacent vertical rod 124. The horizontal leg 130 of the adjacent rearward vertical rod 124 is vertically offset upwardly. A plurality of longitudinal rods 126 extend across each of the compartment 129 in vertically spaced relation and are secured to the vertical rods 124 to reinforce the supporting structure 123. The cross rods 125 and diagonal rod 127 extend between and are secured to the endmost vertical rods 124 at each end of the merchandise support means 119 to reinforce the supporting structure 123.

The shelf elements 120 are disposed on the L-shaped vertical rods 124 with the back 121 in contacting relation to the vertical leg 131 of the L-shaped rod 124 and the lower support surface 122 in overlying contacting relation to the horizontal leg 130. The back 121 of shelf element 120 has a hooked flange which engages one of the longitudinal rods 126 to hold the shelf element 120 in place in support means 119. Merchandise is then supported on shelf element 120 extending upwardly and out from the support means 119 through compartments 129. The shelf elements 120 are offset vertically and laterally in a stepped fashion of increasing elevation rearwardly in the support means 119 such that merchandise stored therein will be visibly displayed and easily accessible.

As shown in FIG. 19, the retainer 94 is secured at each end of the storage and display means 119 to an end vertical rod 132 by means of an angle 133 and the plurality of flat rods 128 spaced laterally across the front of the compartments 129. The retainer clip 94 is disposed in the groove 62 of the closure member 7 in the manner previously discussed. A lip portion 133' of the rearmost vertical rods 124 which is secured to flat rod 128 extends over frame member 12 of back frame 5 and bears thereon to support and retain the support means 119 within housing 2.

Figures 21, 22, 23:
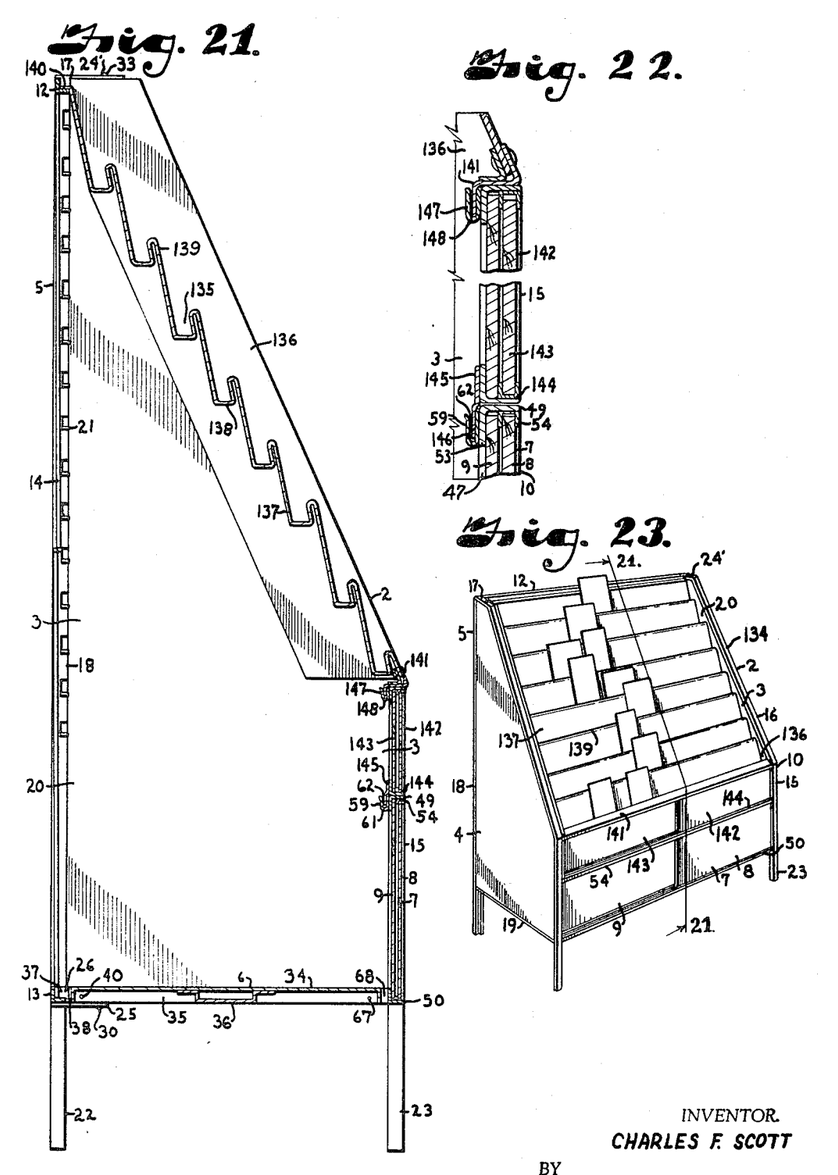
FIG. 21 is a vertical cross-sectional view taken along line 21—21 of FIG. 23.
FIG. 22 is a fragmentary vertical cross-sectional view showing a filler closure member and a means for retaining the merchandise support means in the housing of the storage and display cabinet of FIG. 23.
FIG. 23 is a perspective view of a modified form of the storage and display cabinet.

Referring to FIGS. 21 to 23, another modification is shown wherein the merchandise support means 134 is employed in housing 2. The merchandise support means 134 is comprised of a plurality of upwardly and rearwardly stepped open compartments 135 which extend longitudinally across housing 2 between end wall panels 136. The open compartments 135 may be utilized as shown in FIG. 23 for the display of cards or similar articles.

As illustrated, the individual compartments 135 are formed by the bending of a metal sheet material to provide each compartment with a back portion 137, a bottom surface 138 and a front lip portion 139. The back portion 137 of the uppermost compartment extends upwardly terminating in a flanged end portion 140 which overlies and bears upon the upper frame member 12 of the back frame 5 to support and retain storage and display means 134 in housing 2. The lip portion 139 of the lowermost compartment 135 is secured to a retainer 141 which is similar to the retainer 94 previously discussed.

In order to elevate the merchandise support means 134 to facilitate customer access to the displayed merchandise, a filler 142 is employed to extend the height of the closure member 7 of housing 2. As illustrated, the filler 142 is comprised of a pair of sliding doors 143 enclosed in a track system 144 at the upper and lower edges of filler 142, identical in construction to that previously discussed in regard to closure 7. The lower track 144 has a retainer 145 secured thereto by suitable means with a flange 146 extending downward into groove 62 of closure member 7. The lower track structure 144 rests directly on the upper frame member 49 of closure 7. The upper track 144 has a channel-shaped member 147 which defines a groove 148 extending longitudinally across the filler member 142. The retainer 141 is received in groove 148 in the same manner that the retainer 94 is received in groove 62 in the upper portion of the closure member 7. The merchandise support means 134 is thereby retained in the housing 2 and may only be removed by vertical lifting of the support means 134, thus preventing accidental removal from the collapsible structure.

Referring to the drawings FIGS. 24 to 28, another modification utilizing a merchandise support means, generally referred to by reference numeral 149 in housing 2. The merchandise support means 149 is comprised of a plurality of storage and display sections 150, each section 150 being comprised of a plurality of storage and display units 151 utilized for the storage and display of various materials for wrapping packages.

The storage and display sections 150 are each comprised of a wrapping paper roll, storage and display unit 152, a ribbon roll unit 153, a ribbon bow unit 154 and a finished package display unit 155. Each of the units 152 to 155 is disposed in rows longitudinally across the merchandise support means 149.

A plurality of inclined flat rods 156 are disposed in spaced relation across the front of the merchandise support means 149 defining the individual display and storage sections 150 therebetween. Each of the wrapping paper units 152 is comprised of two of the flat rods 156, vertical L-shaped rods 157 and front vertical rods 158 attached to each of the flat rods 156, a shelf element 159 and a plurality of longitudinal cross rods 160 extending between and secured to the L-shaped vertical rod 157 and front vertical rod 158. The shelf element 159 having a back portion 161 and a merchandise bearing surface 162 has its back portion 161 lying adjacent the longitudinal cross rods 160 which extend between the L-shaped rods 157 of adjacent sections 150 with the merchandise bearing surface 162 in overlying contacting relation to the lower horizontal leg 163 of the L-shaped rods 157. The shelf element 159 may be secured to the longitudinal cross rods 160 by suitable means or, as illustrated, may have a hooked portion 164 at the upper end of back portion 161 of the shelf element 159 which overlies the uppermost longitudinal cross rods 160 to retain the shelf element 159 in position within the merchandise support means 149. It should be noted that in the illustrated embodiment, shelf element 159 extends longitudinally across the entire merchandise support means 149 and is not itself divided into separate individual sections 150, but is continuous and extends across all the display and storage sections 150. A plurality of transverse cross rods 159' and a diagonal cross rod 160' are shown secured to the outer side of the endmost units 152 adjacent side walls 3 and 4 of housing 2 extending between the front vertical rod 158 and the vertical L-shaped rod 157 to provide reinforcing to the structure.

The ribbon roll display and storage unit 153 is disposed adjacent the upper portion of the shelf element 159 and rearwardly thereof with the front edge of the display and storage unit 153 being generally aligned with the back portion 161 of shelf element 159. Each of the display and storage units 153 is comprised of a tray-like member 164 with a wire side retainer 165 and a pair of L-shaped supporting rods 166. The L-shaped supporting rods 166 have a lip portion 167 secured to the flat rods 156 with the lower leg 168 of the L-shaped supporting rods 166 secured to the vertical L-shaped rods 157 of display unit 152. An angular brace 169 extends between the lower leg 168 of supporting rods 166 and the vertical L-shaped rod 157 of the display and storage unit 152 to reinforce supporting rod 166.

The ribbon roll tray 164' has a merchandise supporting surface 170 with front and back walls 171 and 171' respectively and wire side retainers 165. The side walls of the tray have been omitted with the inclusion of a wire retainer 165 which extends along each side of tray 164' and is secured to the front and back walls 171 and 171' respectively to retain the ribbon rolls within tray 164'. Tray 164' is disposed in an inclined position with its back wall 171' in contacting relation to the upper leg 172 of the L-shaped supporting rod 166 and the front corner 173 of tray 164' in contacting relation to the lower leg 168 of the L-shaped supporting rod 166. The upper front corner 174 of tray 164' lies in contacting relation to the angular extension 175 of the vertical L-shaped rod 157 of unit 152 which lies adjacent the flat rod 156, thereby retaining the tray unit 164' in an inclined position to facilitate the forward movement of ribbon rolls stored in tray 164' when the foremost roll is removed from the tray.

Figures 24, 25, 26, 27, 28:
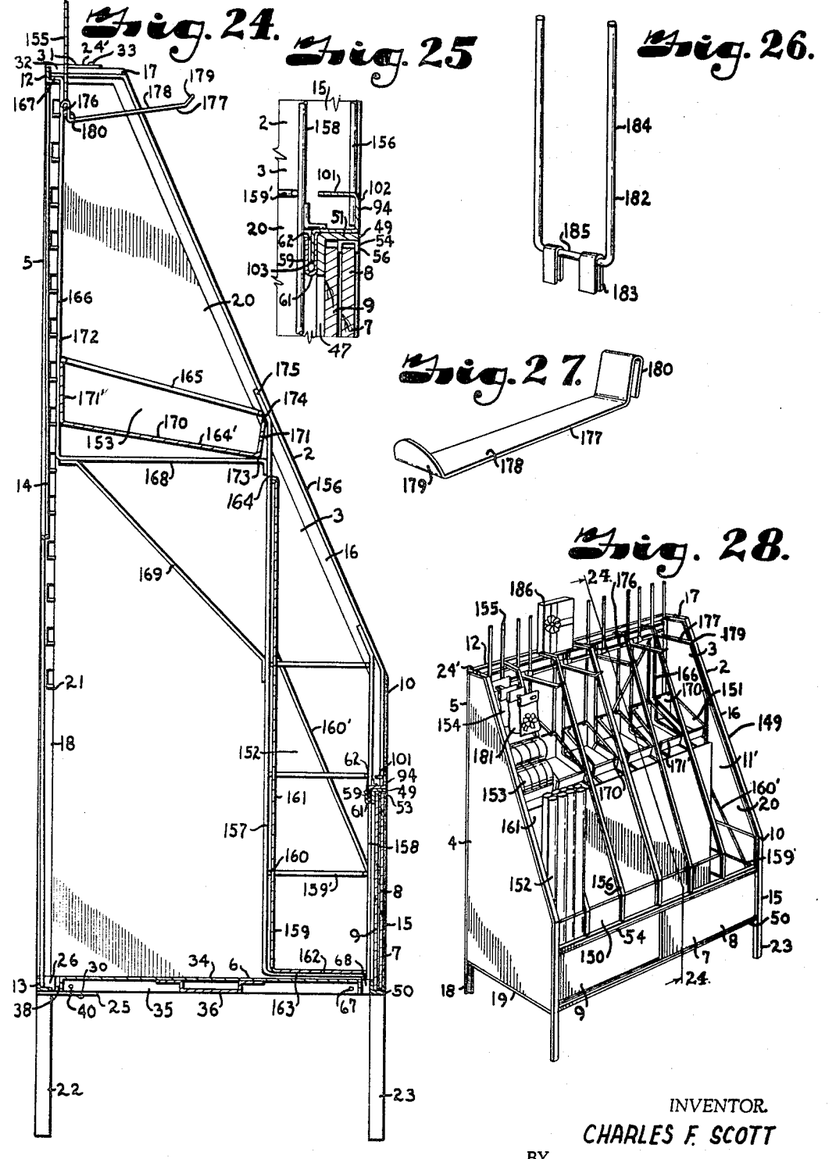
FIG. 24 is a vertical cross-sectional view taken along line 24—24 of FIG. 28.
FIG. 25 is a fragmentary vertical cross-sectional view showing the means for retaining the merchandise support means in the housing of the storage and display cabinet of FIG. 28.
FIG. 26 is a perspective view of a U-shaped rod for retaining display packages on the storage and display cabinet.
FIG. 27 is a perspective view of a bracket shown in FIG. 24.
FIG. 28 is a perspective view of a modified form of the display cabinet.

The ribbon bow display and storage unit 154 is comprised of a horizontal bar 176 and merchandise bracket 177 best shown in FIG. 27. The bar 176 is disposed longitudinally across the display means being secured to the respective L-shape supporting rods 166 of each of the sections 150. The bracket 177 has a merchandise supporting surface 178 with an upturned lip 179 at one end thereof and a hooked portion 180 at the opposite end from the upturned lip 179. As shown in FIG. 24, the supporting surface 178 is disposed at an acute angle to the hooked portion 180 to provide an upward inclination to the supporting surfaces 178 to facilitate the retention of merchandise thereon. The hook portion 180 is received over the longitudinal bar 176 thereby securing bracket 177 in the merchandise support means 149. The ribbon packages 181 have a slot in their upper portion which is received over the upturned lip 179 of bracket 177 and the package is then slid onto the supporting surface 178 and retained thereon.

The package display unit 155, as illustrated in FIG. 26, is comprised of a U-shaped rod 182 with two U-shaped clips 183. The U-shaped rod 182 has a pair of upwardly disposed leg portions 184 with a base portion 185 therebetween. The clips 183 are welded to the base portion 185 of the U-shaped rod 182 and are disposed over the longitudinal bar 176 previously discussed in relation to display and storage section 154, thereby securing the U-shaped rod 182 in the merchandise support means 149. The upwardly disposed leg portions 184 receive a package 186 as shown in FIG. 28 on which is displayed in assembled relation the merchandise contained in display units below.

The merchandise support means 149 is secured within housing 2 by means of a retainer 94 disposed in groove 62 in closure member 7 in the manner previously described. The merchandise support means 149 also has the lip portion 167 formed by each L-shaped supporting rod 166 and flat rod 156 which is in overlying bearing contact with the upper framing member 12 of back frame 5 to assist in retaining and supporting the merchandise support means 149 within housing 2. The mechandise support means 149 may be removed from housing 2 only by vertically lifting retainer 94 from engagement with groove 62 and will not tip forwardly prior to such vertical lifting.

Referring to FIGS. 29 to 32, another modification of a merchandise support means is shown in housing 2 and is generally referred to by the reference numeral 187. The support means 187 is comprised of a plurality of compartments 188 utilized to store and display merchandise in a flat wrap form and a storage and display unit 189 utilized to store and display merchandise in small package form normally having a transparent outer wrapping to facilitate customer inspection of the contents of the package. The merchandise support means 187 is comprised of a plurality of flat rods 190, L-shaped merchandise supporting rods 191, transverse reinforcing rods 192 and a plurality of longitudinal cross rods 193. The flat rods 190 are disposed transversely of support means 187 in spaced relation and divide the merchandise support means 187 into four display sections 194. A reinforcing rod 192 is disposed along the back edge of flat rod 190 having U-shaped spacers 195 to secure rods 192 in spaced relation to the flat rod 190. Longitudinal cross rods 193 are secured to both the reinforcing rods 192 and the flat rod 190. The cross rods 193 secured to the reinforcing rod 192 provide a securing surface for the L-shaped merchandise supporting rods 191. A plurality of L-shaped supporting rods 191 each have an upper leg portion 196 and a lower leg portion 197 with said upper leg portion 196 secured to the longitudinal cross rods 193 which are, in turn, secured to the reinforcing rods 192. The lower leg portion 197 of each of the L-shaped supporting rods 191 are secured to the next adjacent L-shaped merchandise supporting rod 191 along the upper leg portion 196 of said supporting rods 191 to define a plurality of compartments 188 disposed in an overlapping upwardly inclined stepped fashion in each of the sections 194 of the support means 187. A longitudinal cross rod 193 is disposed at each of the intersections between the lower leg 197 and the upper leg 196 of each adjacent L-shaped supporting rod 191 to provide reinforcing to the structure.

The uppermost L-shaped supporting rod 191 has its upper leg portion 196 extending upwardly above the top of housing 2 with a plate 198 disposed adjacent the upper leg portion 196 to cooperate with bracket 199 to provide the display and storage unit 189. The plate 198 has an upper hooked portion 200 which overlies the upper leg 196 of the supporting rod 191 to retain plate 198 in position within the supporting means 187 with the lower edge 201 of plate 198 resting on the lower leg 197 of the L-shaped supporting rod 191.

The bracket 199 has a merchandise supporting surface 202 with an upturned lip portion 203 disposed at one end thereof and a hook portion 204 disposed at the opposite end of the merchandise supporting surface 202. The hooked portion 204 of bracket 199 is received over the corresponding hook portion 200 of plate 198 to retain bracket 199 in the manner shown in FIG. 29. Merchandise in packages having slots therein are then received over the upturned lip portion 203 of bracket 199 and supported on the merchandise supporting surface 202 in the manner shown in FIG. 32.

Figures 29, 30, 31, 32:
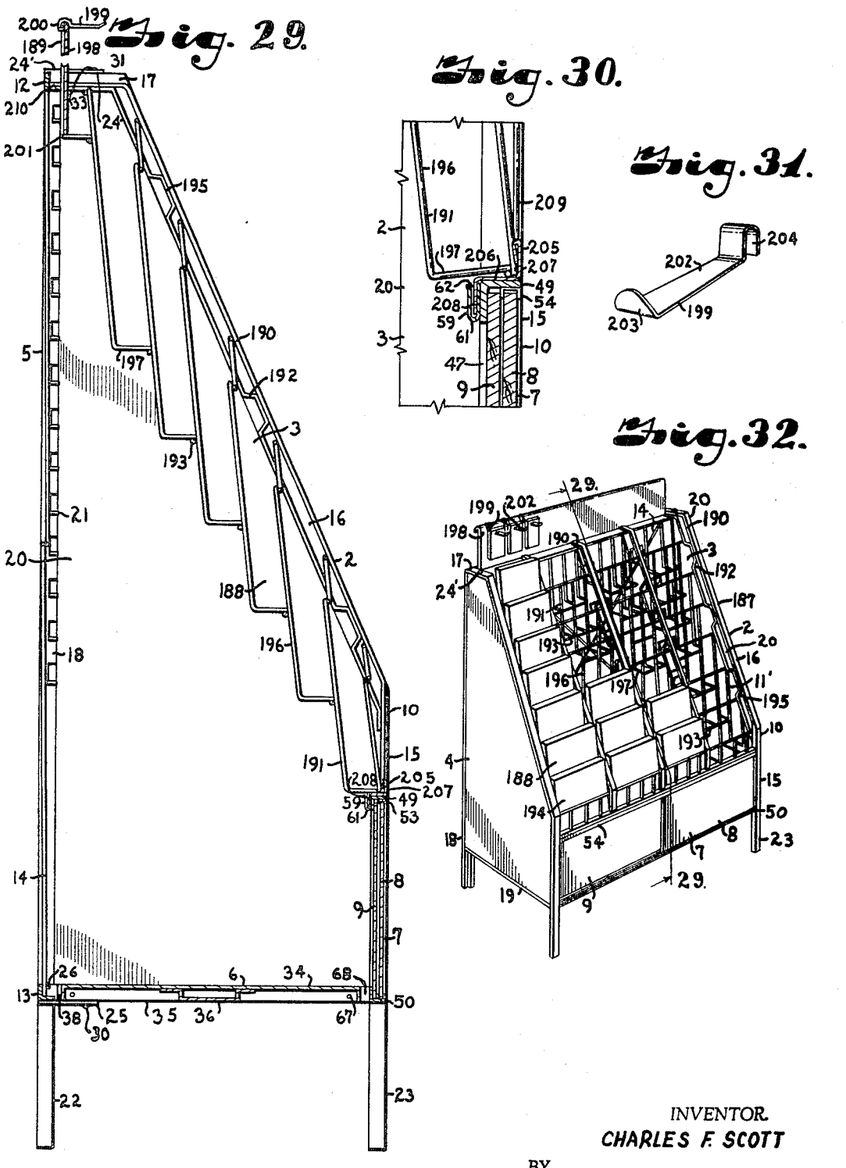
FIG. 29 is a vertical cross-sectional view taken along line 29—29 of FIG. 32.
FIG. 30 is a fragmentary vertical cross-sectional view showing the means for retaining the merchandise support means in the housing of the storage and display cabinet of FIG. 32.
FIG. 31 is a perspective view of a bracket shown in FIG. 29.
FIG. 32 is a perspective view of a modified form of the storage and display cabinet.

A retainer 205 similar to retainer 94 perviously discussed is best shown in FIG. 30 and extends longitudinally across the front of the merchandise supporting means 187. The retainer 205 is illustrated as having a body portion 206 with an upturned lip portion 207 and a downturned lip portion 208. The downturned lip portion 208 is received in groove 62 in the front closure member 7 of housing 2 with the body portion 206 overlying the upper frame member 49 of closure member 7. The upturned lip portion 207 is secured to a downward extension 209 of the flat rods 190 thereby retaining the merchandise supporting means 187 in housing 2 and preventing a forward tipping of said merchandise supporting means 187. An upper horizontal leg 210 of flat rod 190 overlies the upper frame member 12 of back frame 5 and bears thereon to retain and support the merchandise supporting means 187 in an inclined position within housing 2.

It is to be understood that while I have illustrated and described several forms of my invention, it is not to be limited to the specific form or arrangement of parts herein described and shown except insofar as such limitations are included in the claims.

I claim:
1. A cabinet for the display and storage of merchandise comprising:
(a) a foldable housing having a back wall, side walls, a bottom panel and a front wall of lesser height than the back wall with,
(1) cooperative means on the back wall and side walls for mounting said side walls to the back wall so the side walls may swing between a position generally perpendicular to the back wall and a position in opposed face-to-face relation with said back wall,
(2) cooperative means on the back wall and bottom panel for mounting the bottom panel to the back wall so the bottom panel may swing between an outwardly extending position from the back wall and a position in opposed face-to-face relation with said back wall,
(3) cooperative means on the bottom panel and the front wall for mouting the bottom panel to the front wall so the front wall may swing between a generally vertical position, generally perpendicular to the bottom panel and a position in parallel opposed face-to-face relation with said bottom panel,
(4) cooperative means on the bottom panel and side walls for releasably retaining the bottom panel in a generally horizontal position and the side walls in generally perpendicular relation to the back wall,
(5) cooperative means on the front closure member and the side walls for releasably retaining the front closure member in a generally vertical position,
(b) means in said housing for supporting articles of merchandise for storage and display thereof,
(c) cooperative means on said housing and said merchandise support means for supporting and releasably retaining the merchandise support means in said housing, said merchandise support means comprising a plurality of shelf units extending between the opposed side walls of the housing, each unit having a back portion and a merchandise supporting surface, said back portion having a hook flange thereof and said supporting surface having a brace rotatably mounted therto and extending angularly downwardly therefrom and having a retainer means secured thereto, and wherein said side walls have a plurality of tabs extending inwardly therefrom adjacent the back wall to receive the hook flange of the back portion of the shelf unit and the retanier means of the angular brace of said shelf unit to support and retain said shelf units in the housing.

2. A cabinet for the storage and display of merchandise as recited in claim 1 wherein the merchandise support means is compromised of a plurality of shelf elements extending longitudinally between the opposed side walls of said housing and disposed in an upwardly and rearwardly extending stepped fashion with a means for supporting said shelf elements in said stepped fashion.

3. A cabinet as recited in claim 1 wherein the cooperative means on the bottom panel and side walls is comprised of a channel-shaped retainer and means defining a slot in said side walls with the channel-shaped retainer having two leg portions extending downwardly with one leg portion connected to the bottom panel and the other leg portion engageable with the slot in the side walls.

4. A cabinet as recited in claim 1 wherein the front wall has a means thereon defining a longitudinal groove.

5. A cabinet as recited in claim 4 wherein the means defining the longitudinal groove on the front wall is a channel-shaped member having a base portion and two leg portions with one leg portion secured to the front wall and a slot in the base portion adjacent each of the side walls and wherein the side walls each have a retainer means having a flange extending therefrom and engageable between the leg portions of the channel-shaped member and overlying said slot in the base portion of the channel-shaped member to thereby retain the front wall in a vertical position.

6. A cabinet for the display of merchandise comprising:
(a) a pair of laterally spaced apart, upstanding frame members, upwardly spaced apart retaining tabs along said frame members and extending inwardly toward the other of said frame members,
(b) at least one shelf unit extending between the frame members and engaged with certain of said retaining tabs, and a brace having one end engaging another of said retaining tabs and its other end engaging said shelf unit at a point spaced outwardly from said frame members.

7. A cabinet as recited in claim 6 wherein said other end of the brace is rotatably secured to said shelf unit, and said one end is selectively engageable with other tabs so that an outer end of said shelf unit may be adjusted vertically.

8. A cabinet for the display of merchandise comprising:
(a) a pair of laterally spaced apart, upstanding frame members, upwardly spaced apart retaining tabs along said frame members and extending inwardly toward the other of said frame members,
(b) at least one shelf unit extending between the frame members, said shelf unit including a back portion having a hook portion at its upper edge and being hooked over selected retaining tabs,
(c) a base portion on said shelf unit and extending outwardly from the back portion and utilized for supporting merchandise, said shelf unit including side portions,
(d) a base member adjacent each side portion and having an upper end and a lower end, said base members being secured to the base portion of the shelf member at said upper end and having a hook portion at said lower end, said last named hook portions being secured to other retaining tabs.

References Cited
UNITED STATES PATENTS

| | | | |
|---|---|---|---|
| 2,784,847 | 3/1957 | Holroyd | 211—55 |
| 2,798,617 | 7/1957 | Schreiber | 211—55 X |
| 2,153,422 | 4/1958 | Kroman | 211—55 |
| 2,545,255 | 3/1951 | Broce | 211—55 |
| 3,179,479 | 3/1965 | Freedman | 211—55 |
| 3,210,865 | 10/1965 | Muntz | 211—55 X |
| 3,302,797 | 2/1967 | Kolster | 211—55 |

JAMES T. McCALL, *Primary Examiner.*